United States Patent [19]

Eguchi et al.

[11] Patent Number: 5,241,527
[45] Date of Patent: Aug. 31, 1993

[54] RECORDING AND REPRODUCING APPARATUS AND METHOD USING A RECORDING LAYER HAVING A POSITIONING REGION

[75] Inventors: Ken Eguchi, Yokohama; Kiyoshi Takimoto, Kanagawa; Haruki Kawada, Yokohama; Junji Ohyama, Yamato, all of Japan

[73] Assignee: Canon Kabushiki Kaisha, Tokyo, Japan

[21] Appl. No.: 491,289

[22] Filed: Mar. 9, 1990

[30] Foreign Application Priority Data

Mar. 16, 1989 [JP] Japan ................................ 1-65697

[51] Int. Cl.⁵ .......................... G11B 9/00; G11B 7/00; H01J 37/26
[52] U.S. Cl. ................................ 369/126; 369/101; 369/275.1; 250/306
[58] Field of Search ............... 369/101, 126, 284, 285, 369/121, 275.1; 250/310, 309, 308, 307, 306, 305; 365/118; 430/292, 340, 346

[56] References Cited

U.S. PATENT DOCUMENTS

| 4,575,822 | 3/1986 | Quate | 365/174 |
|---|---|---|---|
| 4,672,265 | 6/1987 | Eguchi et al. | 313/504 |
| 4,693,915 | 9/1987 | Matsuda et al. | 427/256 |
| 4,725,513 | 2/1988 | Eguchi et al. | 428/690 |
| 4,734,338 | 3/1988 | Eguchi et al. | 428/690 |
| 4,741,976 | 5/1988 | Eguchi et al. | 428/690 |
| 4,753,830 | 6/1988 | Matsuda et al. | 427/434 |
| 4,773,742 | 9/1988 | Matsuda et al. | 350/357 |
| 4,775,820 | 10/1988 | Eguchi et al. | 313/504 |
| 4,780,790 | 10/1988 | Takimoto et al. | 361/323 |
| 4,798,740 | 1/1989 | Tomida et al. | 427/43.1 |
| 4,835,083 | 5/1989 | Sakai et al. | 430/130 |
| 4,910,107 | 3/1990 | Kawada et al. | 369/285 |
| 4,929,524 | 5/1990 | Sakai et al. | 430/56 |
| 4,965,174 | 10/1990 | Arai et al. | 430/292 |
| 4,998,016 | 3/1991 | Nose et al. | 369/101 |
| 5,004,671 | 4/1991 | Nishimura et al. | 369/285 |
| 5,072,116 | 12/1991 | Kawade et al. | 369/126 |

FOREIGN PATENT DOCUMENTS

| 0174860 | 3/1986 | European Pat. Off. |
| 0272935 | 6/1988 | European Pat. Off. |
| 0275881 | 7/1988 | European Pat. Off. |
| 0304893 | 3/1989 | European Pat. Off. |
| 63-161552 | 7/1988 | Japan |
| 63-161553 | 7/1988 | Japan |
| 1-16940 | 5/1989 | Japan ................... 369/126 |

OTHER PUBLICATIONS

Binning, et al., 55 Helvetica Physica Acta, pp. 726-735 (1982).
Deatherage, et al., 167 Molecular Biology, pp. 823-852 (1983).
Inatumi, et al., Chemistry Letters, pp. 1191-1194 (1983).

*Primary Examiner*—W. R. Young
*Assistant Examiner*—Thang V. Tran
*Attorney, Agent, or Firm*—Fitzpatrick, Cella, Harper & Scinto

[57] ABSTRACT

A recording-reproducing apparatus comprises a recording medium provided with a recording layer containing at least two kinds of compounds, which compounds respectively form phases, and having regular periodic structure comprising said phases as constituent units; a probe electrode disposed opposingly to said recording medium; a circuit for applying a voltage between said recording medium and probe electrode; and a circuit for detecting an electric current flowing between said recording medium and probe electrode. A recording-reproducing method comprises detecting by the use of a probe electrode, at least one phase on a recording medium of the apparatus and recording information or reproducing the recorded information at the position where said phase has been detected.

18 Claims, 4 Drawing Sheets

SCANNING IN X-DIRECTION

RECORDING AND REPRODUCING APPARATUS AND METHOD USING A RECORDING LAYER HAVING A POSITIONING REGION

BACKGROUND OF THE INVENTION

1. Field of The Invention

The present invention relates to a recording-reproducing apparatus, and a recording-reproducing method, capable of high-density recording and also capable of recording and reproducing information in a good reproducibility.

2. Related Background Art

In recent years, uses of memory materials are directed to computers and their related equipment, video disks, digital audio disks, etc., which have been the nucleus of electronic industries, and the development of materials therefor is in very energetic progress. Performances required for the memory materials may vary depending on the uses, but generally include the following:

(1) To have a high density and a large recording capacity.

(2) To have a high recording-reproducing response speed.

(3) To consume a small electric power.

(4To have a high productivity and be inexpensive.

Magnetic memories or semiconductor memories comprised of materials such as magnetic materials or semiconductors have been hitherto chiefly used, but, with recent progress in laser techniques, inexpensive and high-density recording mediums have appeared on the market, which utilize optical memory making use of an organic thin film comprising an organic coloring matter or a photopolymer or the like.

On the other hand, development has been made on a scanning tunnel microscope (hereinafter "STM") capable of directly observing the electron structure of surface atoms of a conductor G. Binning et al, Helvetica Physica Acta, 55, 726 1982)]. which has enabled measurement in a high resolution of real space images regardless of a single-crystalline or amorphous state. Moreover, it has the advantage of the capability of making the observation at a low electric power without giving to the medium any damage that can be caused by currents, and also it can operate in the atmosphere and can be used for various materials. Hence, a wide application is expected in it.

The STM utilizes the mechanism in which a tunnel current flows when a voltage is applied between a metallic probe (a probe electrode) and a conductive substance and both of these are brought close to each other with a distance of about 1 nm. This current is very sensitive to the changes In the distance between the both. The surface structure of the actual space can be drawn by so scanning the probe that the tunnel current can be kept constant, and at the same time a variety of information concerning the total electron clouds of the surface atoms can be read. Here, the resolution power resolving power in the in-plane direction is about 0.1 nm. Hence, the application of the principle of the STM makes it possible to well record and reproduce information in a high density of an atomic order (several Å). As recording-reproducing methods used here, Japanese Patent Applications Laid-Open No. 63-161552 and No. 63-161553 propose a method in which the surface state of a suitable recording layer is changed using particle rays (electron rays, ion rays) or high-energy electromagnetic waves such as X-rays and energy rays such as visible light and ultraviolet light, to make a record, which is reproduced using the STM; and a method in which a thin film comprising a material having the memory effect to voltage current switching characteristics, as exemplified by a $\pi$-electron organic compound or chalcogen compounds, is used as a recording layer and information is recorded and reproduced using the STM.

It is true that both of these recording-reproducing methods are methods that enable high-density recording making the most of the features of the STM, but such high-density recording greatly depends on the scanning accuracy and positioning accuracy of the probe electrode in the in-plane direction of a recording surface. At present, mechanisms for minutely moving a probe electrode (i.e., micromovement mechanisms) utilize a voltage actuator in which a piezoelectric device is used. There, however, is the problem of the hysterisis of a piezoelectric material, bringing about an obstacle to the achievement of the high-density recording. In addition, the mechanism for the micromovement scanning of the probe electrode in the XY-directions is not necessarily satisfactory in view of the rectangulariry between the X-axis and Y-axis. In other words, there is a problem in the position reproducibility of the micromovement of the probe electrode or scanning mechanisms when information is recorded and reproduced. As a means for solving such a problem, it can be contemplated that a graduation serving as a basis for the position end direction is beforehand marked on a recording medium and the information concerning the position and directionality is detected from such a graduation so that the recording and reproduction are carried out at the position corresponding to the positional information thus detected. Such a method has been firstly employed in recording-reproducing methods of VTR system, as well as in recording systems that are nowadays generally grouped into the high-density recording system, as exemplified by optical disks or optical cards. In such instances, finer positional information must be recorded and detected as a matter of course, with an increase in the density and fineness of recording. Under the present circumstances, however, the fine-processing techniques such as EB drawing and ion beam processing have a limit in the accuracy, of a resolution of 0.01 $\mu$m at best. Detection techniques such as the optical heterodyne process also have a limit of a resolution of 0.01 $\mu$m. Thus, in the recording and reproduction using the STM, there have been the problems that the accuracy is extremely poor and a complicated process is required for lattice formation.

SUMMARY OF THE INVENTION

Accordingly, an object of the present invention is to provide a recording-reproducing apparatus having a recording medium endowed with a highly accurate positioning performance and can record and reproduce information in a high density and a good reproducibility, when used in a high-density recording-reproducing method carried out by an electrical means using a probe electrode, and also provide a recording-reproducing method making use of such an apparatus.

The present invention provides a recording-reproducing apparatus comprising;

a recording medium provided with a recording layer containing at least two kinds of compounds, which compounds respectively form phases, and having regular periodic structure comprising said phases as constituent units;

a probe electrode disposed opposingly to said recording medium;

a means for applying a voltage between said recording medium and probe electrode; and a means for detecting an electric current flowing between said recording medium and probe electrode.

The present invention also provides a recording-reproducing method comprising;

detecting by the use of a probe electrode, at least one phase on a recording medium provided with a recording layer containing at least two kinds of compounds, which compounds respectively form phases, and having regular periodic structure comprising said phases as constituent units; and recording information or reproducing the recorded information at the position where said phase has been detected.

In a preferred embodiment, the recording-reproducing method comprises;

detecting by the use of a probe electrode, at least one phase on a recording medium provided with a recording layer containing at least two kinds of compounds, which compounds respectively form phases, and having regular periodic structure comprising said phases as constituent units: and recording information or reproducing the recorded information under irradiation with light, at the position where said phase has been detected.

DETAILED DESCRIPTION OF THE PREFERRED EMBODIMENTS

The recording-phase detection means according to the present invention utilizes the mechanism in which a tunnel current flows when a voltage is applied between a probe electrode and a recording medium and both of these are brought close to each other with a distance of about 1 nm as in the recording and reproduction of information. Since the tunnel current depends on the work function on the surface of the recording medium, it is possible to read the information concerning various states of surface electrons. With utilization of this mechanism, at least one phase may be detected on a recording medium provided with a recording layer containing at least two kinds of compounds, which compounds respectively form phases, and having regular periodic structure comprising said phases as constituent units, where information can be recorded on said phase or the recorded information can be reproduced therefrom. The recording medium used in this way includes protein-lipid bimolecular membranes constituted of protein and lipid. They are exemplified by purple membranes extracted from cell membranes of highly halophile, and S-layers present in cell walls of thermophile. They can further be exemplified by protein-lipid bimolecular membranes obtained by reconstitution of the membrane protein as mentioned above and various lipid molecules.

Figure 4:
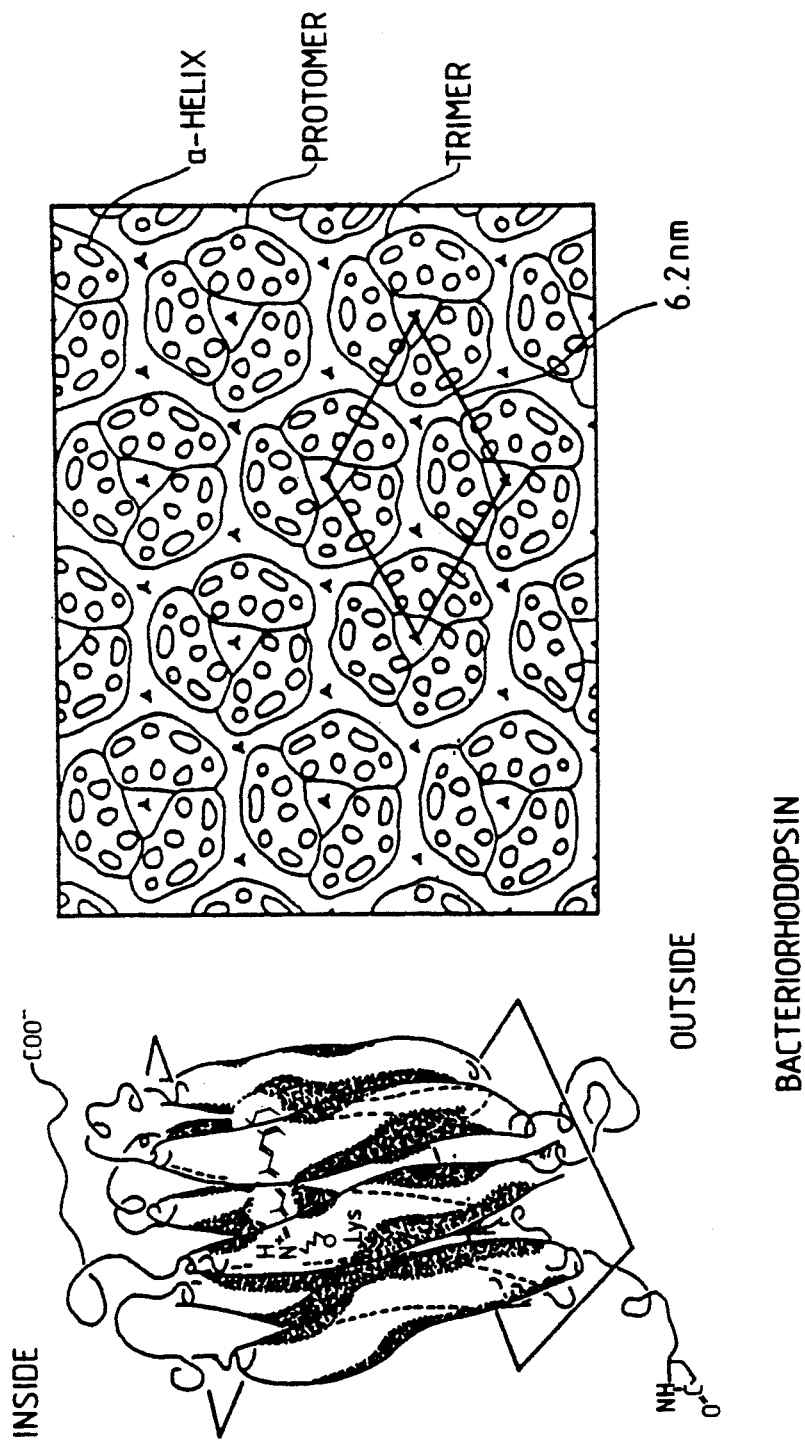
FIG. 4 illustrates structure of a purple membrane.

FIG. 4 illustrates analytical results on crystal structure of a purple membrane. Bacteriorhodopsin, which is a protein present in the purple membrane has the structure that its units are arranged in hexagonal sequence with a distance of 6 nm between the units) and the gap between them is filled with a lipid bimolecular membrane. Thus, the recording and reproduction can be carried out while detecting the difference in the surface state between the lipid molecule and bacteriorhodopsin, and reading the relative positional information. With regard to the recording medium that employs the above protein-lipid bimolecular membrane, various membrane forming methods can be applied, including the electrodeposition process. Among conventional techniques, the LB process is very suitable in view of controllability, readiness, and reproducibility.

According to the LB process, the above protein-lipid bimolecular membrane can be built up layer by layer on an electrode substrate while controlling the orientation direction. Thus, it is possible to stably supply a recording medium that has a thickness of a molecular order and is uniform and homogeneous over a large area. In order to control the flowing electric charge so hat he distance between a recording layer and the probe electrode can be kept constant, the recording layer, which has insulation properties, must have a sufficiently small layer thickness. The memory effect in the electrical switching is exhibited when the recording layer has a layer thickness of from several nm to several hundred nm. In the recording medium used in the present invention, however, the recording layer may preferably have a layer thickness ranging from several nm to 50 nm, and most preferably from 5 nm to 20 nm. The above protein-lipid bimolecular membrane has insulation properties. Hence, a substrate that supports the bimolecular membrane must have a character as an electrode, where all conductive materials can be used so long as they have an electrical conductivity of not less $10^{-6}$ ($\Omega\cdot$cm$^{-1}$) They include sheets of metals such as Au, Pd, Ag, Al, In, Sn, Pb and W, or alloys of these, glass, ceramics or plastic materials on which these metals or alloys are deposited, or Si (crystalline or amorphous) and graphite, as well as a number of materials including conductive oxides such as ITO.

The tip of the probe electrode used in the present invention must be as sharp as possible so that the resolution for recording-reproduction-erasure can be increased. In the present invention, employed is a probe obtained by mechanically abrading Pt of 1 mm in diameter so as to give a tip in the shape of a cone of 90°, followed by application of an electric field in an ultra-high vacuum to evaporate surface atoms. The shape of the probe and the processing method, however, are by no means limited to these. The number of the probe electrode also may not be limited to one, and a plurality of probe electrodes may be used, such that probe electrodes are separately used for the recording end the reproduction.

Figure 1:
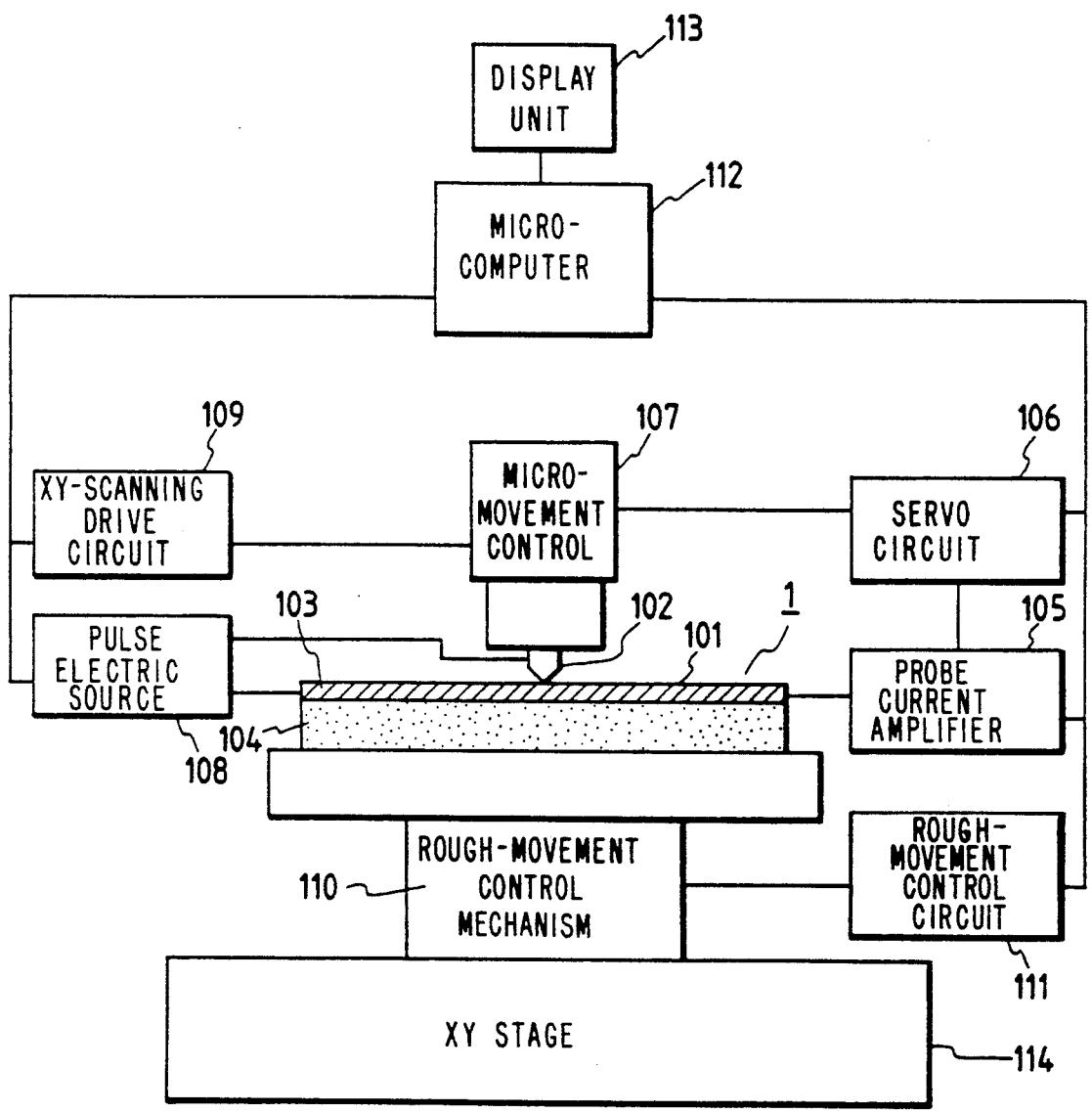
FIG. 1 is a brock diagram of an recording-reproducing apparatus used in the present invention.

FIG. 1 is a brock diagram to illustrate a recording-reproducing apparatus of the present invention. In FIG. 1, the numeral 106 denotes a servo circuit for controlling a micromovement control mechanism 107 in which a piezoelectric device is used so as to keep constant the distance between a recording layer 101 and a probe electrode 102. The mumeral 105 denotes a probe current amplifier. The numeral 108 denotes a pulse electric source for applying a pulse voltage for the recording-reproduction-erasure, to the recording layer 101 provided between the probe electrode 102 and a substrate electrode 103. Since a probe current abruptly changes when the pulse voltage is applied, the servo circuit 106 controls a hold circuit so as to be turned on so that the output voltage can be kept constant during that time.

A rough-movement control mechanism 110 and a rough-movement control circuit 111 carry out the rough-movement control of the distance between the probe electrode end a recording medium 1 so that a probe current of about $10^{-9}$ A can be previously obtained. The numeral 104 denotes a substrate.

The numeral 109 denotes an XY-scanning drive circuit for controlling the movement of the probe electrode in the XY-directions. Here, the magnitude and phase of the voltage applied for the scanning drive of the probe in the X-direction and Y-direction may be adjusted. The locus of the probe electrode 102 can be thereby controlled in various forms.

These respective mechanical units are all centrally controlled by a microcomputer 112. The numeral 113 denotes a display unit. Mechanical performances in the movement control using the piezoelectric device are shown below.

Z-direction micromovement control range: 0.1 nm to 1 $\mu$m

Z-direction rough-movement control range: 10 nm to 1 mm

XY-direction scanning range: 0.1 nm to 1 $\mu$m

Measurement-control permissible error: <0.1 nm

EXAMPLES

The present invention will be described below in greater detail by giving Examples.

EXAMPLE 1

The recording-reproducing apparatus as shown in FIG. 1 was used. A probe electrode made of platinum was used as the probe electrode 102. This probe electrode is under the micromovement control for its distance Z) by means of the micromovement control mechanism 107 which controls the distance between the surface of the recording layer 10 and the probe electrode and employs a piezoelectric device so as to keep the current constant. In addition, the micromovement control mechanism 107 is so designed that it can also control the micromovement in the in-plane XY-directions while keeping the distant Z) constant.

Figure 2A:
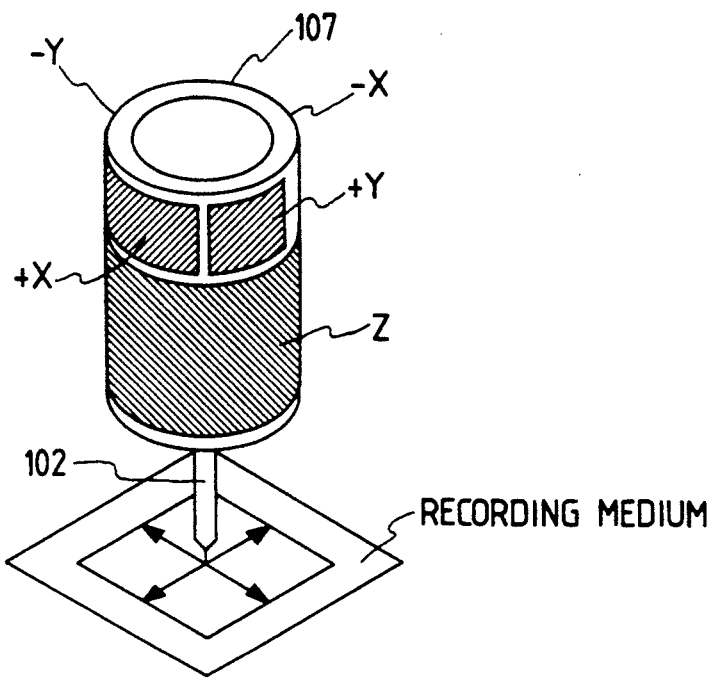
FIGS. 2A and 2B are respectively a diagramatic view of a micromovement control mechanism and a view to illustrate the manner of scanning.
Figure 2B:
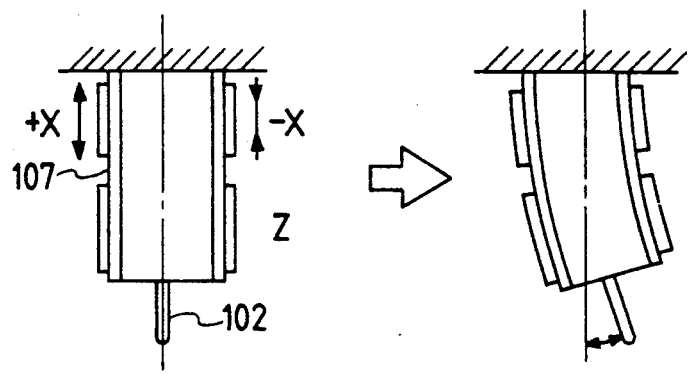

FIG. 2A is a diagramatic view of the micromovement control mechanism 107, the probe electrode 102 and the recording medium. The micromovement control mechanism 107 comprises a cylindrical piezoelectric device and an electrode that applies a voltage for the micromovement control in the X-direction, Y-direction and Z-direction. For example, it can make scanning in the X-direction by applying a voltage to +X, −X as shown in FIG. 2B. The probe electrode 102 can also perform direct recording-reproduction-erasure. The recording medium is placed on an XY stage 114 having a high precision, and can be moved to any desired position.

An experiment for the recording-reproduction-erasure carried out using a purple membrane formed on the substrate electrode 103 will be reported below in detail.

Figure 3:
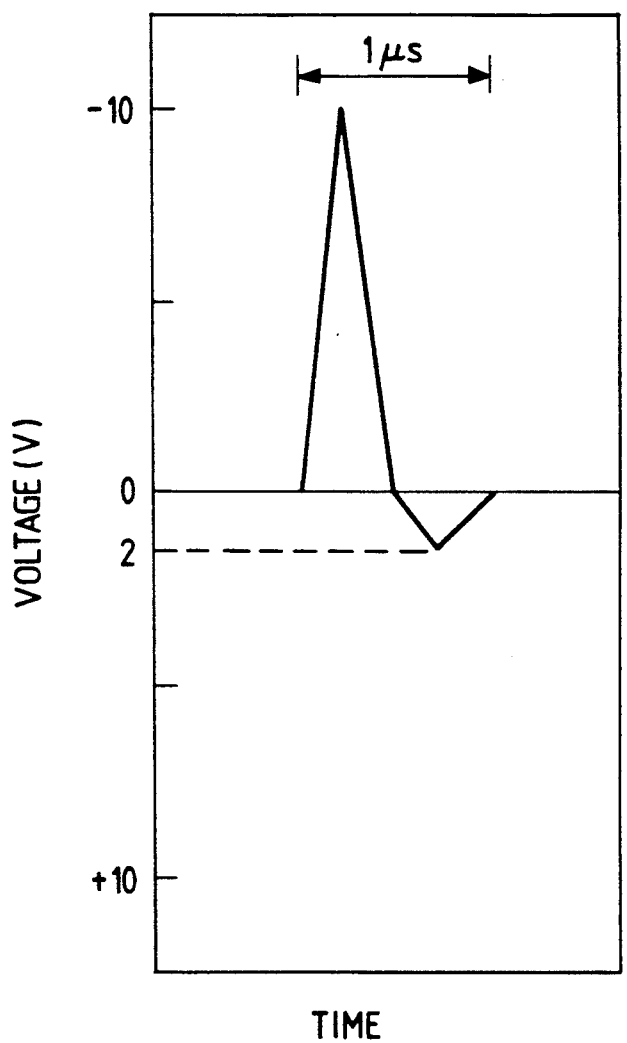
FIG. 3 shows a recording-signal wave form.

The recording medium 1 having the recording layer 101 on which a layer of purple membrane had been built up was placed on the XY stage 114. The probe electrode 2 was first visually positioned, and firmly fixed thereon. A voltage of +100 mV was applied between an Au electrode (earth side) 103 and the probe electrode 102, and the distance (Z) between the probe electrode 102 and the recording layer 101 was adjusted while monitoring the current. Here, a probe current Ip used for controlling the distance (Z) between the probe electrode 102 and the surface of the recording layer 101 was so set as to be $10^{-9} A \geq Ip \geq 10^{-12} A$. The probe current Ip was set to be 10 pA, and a scanning tunnel microscope image on the recording medium was measured. It was possible to obtain a topogram with the structure similar to that shown in FIG. 3. Next, while the probe electrode was scanned under the probe voltage and probe current set to 100 mV and 10 pA, respectively, in the same manner as in the above, a maximum value of the output of the servo circuit 106 was detected, which was synchronized with bit information, and then the pulse electric source 108 was operated to apply a triangular-wave pulse voltage having the wave form as shown in FIG. 3, to a specified position on the topogram. Thereafter, the tunnel microscope image was measured under the same conditions as the above to reveal that the topogram output between the state (1) in which pulse voltage had been applied and the state (0) in which no pulse voltage had been applied was changed by the factor of one figure or more. Namely, the change in the surface state of the purple membrane was recorded as unevenness on the topogram.

Next, on the above recording medium on which the recorded information had been written, a triangular-wave pulse voltage under a peak voltage of 5 V with a pulse width of $\mu$s was applied at a maximum position of the topogram. Thereafter, the tunnel microscope image was again measured to reveal that the surface state, having had the unevenness between the maximum value and minimum value, was returned to the initial state. Namely, it was possible to erase the recorded information.

The purple membrane used in the above experiment was prepared in the following way:

An optically polished glass substrate was carefully cleaned. Thereafter, Cr was deposited by vacuum deposition to a thickness of 5 nm to provide a subbing layer, and Au was also deposited by the same process to a thickness of 40 nm. An electrode substrate was thus formed.

A solution obtained by dispersing purple membranes extracted from highly halophilic bacterium by a conventionally known method, in a 25% DMF/water mixed solvent so as to give an absorbance of 1 (at 570 nm) was spread on a 0.5 mM calcium chloride aqueous phase of pH 6.7. A monomolecular film was thus formed on the water surface. After the spreading, compression of the monomolecular film was immediately started. The surface thickness was increase to 20 mN/m, and while keeping the thickness constant the film was beforehand divided in the size of the above electrode substrate. The divided monomolecular films were built up on the electrode substrate by the horizontal sticking method. The operation to build up the films was repeated appropriate times, thus forming a recording mediums each comprising the above electrode substrate on which the purple membrane(s) was/were built up in 1, 2, 3, 4, 5 or 10 layer(s). Recording-reproducing tests were carried out on the recording medium. Recording-reproducing tests were also carried out on the recording mediums with varied substrate electrodes. Results obtained are shown in Table 1.

Evaluation was made according to the following criterions.

Evaluation on recording performance (erasure performance):

Probability of the recording (erasure) achievable when record writing pulses (erasure voltages were repeatedly applied.
A . . . Not less than 99%.
B . . . Not less than 90% and less than 99%.
C . . . Less than 90%.
ON/OFF ratio:
Ratio of tunnel currents detected in the recorded state and the unrecorded (or erased) state.
A . . . Not less than 20 dB.
B . . . Not less than 10 dB and less than 20 dB.
C . . . Less than 10 dB.
Evaluation on the detection of recording position:
Difference between the crest and root of the topogram.
A . . . Not less than 1 Å.
B . . . Not less than 0.5 Å and less than 1 Å.
C . . . Less than 0.5 Å.

TABLE 1

| Number of layer | Substrate electrode | Recording performance | ON/OFF ratio | Erasure performance | Detection of recording position |
| --- | --- | --- | --- | --- | --- |
| 1 | Gold | A | A | A | A |
| 1 | Platinum | A | A | A | A |
| 1 | Graphite | A | A | A | A |
| 1 | Au/Pd | A | A | A | A |
| 1 | Si | A | A | A | A |
| 2 | Gold | A | A | A | A |
| 2 | Graphite | A | A | A | A |
| 2 | Si | A | A | A | A |
| 3 | Gold | A | A | A | A |
| 3 | Si | B | A | A | B |
| 4 | Gold | A | A | A | B |
| 5 | Gold | B | B | B | B |
| 10 | Gold | C | B | B | C | manner as in Example 1. Light from a halogen lamp (12 V, 50 W) was subjected to spectroscopy using a red filter, and shed on the surface of the purple membrane. As a result, the S/N ratio of recording-position detecting signals was improved and the rate of occurrence of recording errors was reduced to half.

EXAMPLE 3

In 2 mQ of a basal salt solution (4.3M NaCl, 0.275M KCl, 0.080M MgSO4 and 0.009M sodium tartarate: pH 7.0) kept at 4° C., 1 mQ of the purple membrane as used in Example 1 was suspended, followed by ultrasonic stirring for 30 seconds. The resulting suspension was then stored. Next, phosphatidylcholine extracted from soybeans was purified using a silica gel column by a conventionally known method. The state of purification was confirmed by thin layer chromatography using Silica Gel 60 TLC produced by Merck and Co., Inc. Thereafter, the purified product was dissolved in a mixed solvent of chloroform acetone/acetic acid/methanol/water (5:2:1:0.5) so as to give a concentration of 0.16 mg/mQ. On the purple membrane suspension, 0.5 mQ of the resulting lipid solution was gently added so as to form a layer, followed by addition of hexane in a small amount. The mixture was thereafter vigorously stirred for 5 seconds, and then centrifuged at 1,500 x g for 10 minutes. After removal of the aqueous phase at the lowest layer, 2.2 mQ of hexane was added, followed by ultrasonic stirring for 60 seconds immediately before the spreading on an LB trough aqueous phase, to give a sample. The mixed sample of the purple membrane and soybean phosphatidylcholine, thus prepared, was built up in one layer on a gold electrode in the same manner as in Example 1. A recording medium was thus obtained, which was then subjected to the same recording-reproducing tests as in Example 1. As a result, it was possible to use it as a medium having a high recording density like the medium according to Example 1.

EXAMPLE 4

Example 1 was repeated to carry out recording-reproducing tests, except that the S-layer extracted from acidophilic thermophile bacteria was used as the recording medium in place of the purple membrane used in Example 1. As a result, the recording medium was found to be usable as a medium having a high recording density like that in Example 1. The recording medium in which the S-layer was used was prepared by the method as described below.

In respect of an acidophilic thermophile *Sulfolobus acidocaldarius* strain 7, collection, isolation and cultivation were carried out according to the Inatomi et al's method [Ken-ichi Inatomi, Masayuki Ohba & Tairo Qshima, Chemistry Letters, 1191-1194 (1983)]. According to the Inatomi et al's method mentioned above, cell wall protein, S-layer of *S. acidocaldarius*, was extracted. The S-layer was suspended in distilled water to give a concentration of 10 mg/mQ, and dispersed by treatment in a water-bath ultrasonic generator (manufactured by Branson Co.) for 30 seconds. A portion of the dispersion was taken out and observed with a transmission electron microscope according to, for example, the Deatherage et al's method [J. F. Deatherage, K. A. Taylor & L. A. Amos, Journal of Molecular Biology, 163, 823-852 (1983)] to confirm that the S-layer was comprised of fragments of single layers.

The S-layer suspension prepared by the method described above was dropped on a glass sheet on which for example, indium tin oxide had been deposited, or a glass substrate on which gold had been deposited and a hydrophilic treatment had been further applied. After droplets were washed with distilled water, the excess water was blotted with filter paper. The water was further completely removed in a vacuum desiccator.

In the Examples having been set out above, methods of preparing the recording medium have been described. Any other film formation methods, however, may be used so long as hey can form very uniform films, without limitation to the methods described in Examples. In the present invention, there are no limitations at all also on the materials for the substrate, or the shape and surface structure of the substrate.

Here has been disclosed a really novel recording-reproducing apparatus and method that have simplified the recording-reproducing operation because of the function as a reference coordinate, possessed by the recording medium itself, and can record information in a much higher density than the conventional apparatus and methods.

We claim:

1. A recording and reproducing apparatus comprising:
   (1) a recording medium provided with a recording layer containing a repeating pattern of a plurality of first regions, each of said first regions containing a recording compound on which information can be recorded and from which recorded information can be reproduced, wherein said first regions are separated from each other by at least one second region containing a positioning compound, from which relative positioning information may be read;

[2] a probe electrode disposed opposingly to said recording medium;

[3] a means for applying a voltage between said recording medium and probe electrode; and

[4] a means for detecting an electric current flowing between said recording medium and probe electrode.

2. A recording and reproducing apparatus according to claim 1, wherein said recording compound and said positioning compound are both organic compounds.

3. A recording and reproducing apparatus according to claim 1, wherein said recording compound comprises a protein and said positioning compound comprises a lipid.

4. A recording and reproducing apparatus according to claim 1, wherein said first and second regions together constitute a protein-lipid composite membrane comprising bacteriorhodopsin as said recording compound and a lipid as said positioning compound.

5. A recording and reproducing apparatus according to claim 1, wherein said first and second regions together constitute a purple membrane extracted from a highly halophilic bacterium.

6. A recording and reproducing apparatus according to claim 1, wherein said first and second regions together constitute a heat-stable protein-lipid membrane extracted from a thermophilic bacterium.

7. A recording and reproducing method comprising:
(1) detecting, by the use of a probe electrode, at least one region on a recording medium provided with a recording layer containing a repeating pattern of a plurality of first regions, each of said first regions containing a recording compound on which information can be recorded and from which recorded information can be reproduced, wherein said first regions are separated from each other by at least one second region containing a positioning compound, from which relative positioning information may be obtained and
(2) either recording information or reproducing the recorded information at the position where said first region has been detected.

8. A recording and reproducing method according to claim 7, wherein said recording compound and said positioning compound are both organic compounds.

9. A recording and reproducing method according to claim 7, wherein said recording compound comprises a protein and said positioning compound comprises a lipid.

10. A recording and reproducing method according to claim 9, wherein sad first and second regions together constitute a protein-lipid composite membrane comprising bacteriorhodopsin as said recording compound and a lipid as sad positioning compound.

11. A recording and reproducing method according to claim 7, wherein said first and second regions together constitute a purple membrane extracted from a highly halophilic bacterium.

12. A recording and reproducing method according to claim 7, wherein said first and second regions together constitute a heat-stable protein-lipid membrane extracted from a thermophilic bacterium.

13. A recording and reproducing method comprising:
(1) detecting, by the use of a probe electrode, at least one region on a recording medium provided with a recording layer containing a repeating pattern of a plurality of first regions, each of said first regions containing a recording compound on which information can be recorded and from which recorded information can be reproduced, wherein said first regions are separated from each other by at least one second region containing a positioning compound, from which relative positioning information may be obtained and
(2) either recording information or reproducing the recorded information, under irradiation with light, at the position where said first region has been detected.

14. A recording and reproducing method according to claim 13, wherein said recording compound and said positioning compound are both organic compounds.

15. A recording and reproducing method according to claim 13, wherein said recording compound comprises a protein and said positioning compound comprises a lipid.

16. A recording and reproducing method according to claim 13, wherein said first and second regions together constitute a protein-lipid composite membrane comprising bacteriorhodopsin as said recording compound and a lipid as said positioning compound.

17. A recording and reproducing method according to claim 13, wherein said first and second regions together constitute a purple membrane extracted from a highly halophilic bacterium.

18. A recording and reproducing method according to claim 13, wherein said first and second regions together constitute a heat-stable protein-lipid membrane extracted from a thermophilic bacterium.

* * * * *

UNITED STATES PATENT AND TRADEMARK OFFICE
CERTIFICATE OF CORRECTION

PATENT NO. : 5,241,527
DATED : August 31, 1993
INVENTOR(S) : EGUCHI, ET AL.

It is certified that error appears in the above-indentified patent and that said Letters Patent is hereby corrected as shown below:

On the title page, items

[30] FOREIGN APPLICATION PRIORITY DATA:

Insert: --Mar. 6, 1990 [JP]  Japan..........2-56130--.

[56] REFERENCES CITED:

OTHER PUBLICATIONS, "Inatumi, et al." should read --Inatomi, et al.--.

COLUMN 1:

Line 27, "(4To" should read --(4) To--;
Line 39, "conductor G." should read --conductor [G.--;
Line 40, "1982)]." should read --(1982)].--;
Line 54, "In" should read --in--; and
Line 59, "power" should read --or--.

COLUMN 2:

Line 19, "hysterisis" should read --hysteresis--;
Line 25, "gulariry" should read --gularity--; and
Line 66, "comprising;" should read --comprising:--.

UNITED STATES PATENT AND TRADEMARK OFFICE
CERTIFICATE OF CORRECTION

PATENT NO. : 5,241,527
DATED : August 31, 1993
INVENTOR(S) : EGUCHI, ET AL.

It is certified that error appears in the above-indentified patent and that said Letters Patent is hereby corrected as shown below:

COLUMN 3:

Line 22, "comprises;" should read --comprises:--;
Line 34, "brock" should read --block--; and "an" should read --a--;
Line 36, "diagramatic" should read --diagrammatic--;
Line 49, "1 nm" should read --1 nm,--;
Line 59, "phase" should read --phases--;
Line 64, "highly halophile," should read --halophilic bacterium--; and
Line 65, "thermophile," should read --thermophilic bacterium--.

COLUMN 4:

Line 5, "with" should read --(with--;
Line 23, "hat he" should read --that the--;
Line 38, "($\Omega \cdot cm^{-1}$)" should read --($\Omega \cdot cm^{-1}$).--;
Line 55, "electrode" should read --electrodes--;
Line 57, "end" should read --and--;
Line 59, "brock" should read --block--; and
Line 65, "mumeral" should read --numeral--.

COLUMN 5:

Line 9, "end" should read --and--;
Line 40, "Z)" should read --(Z)--;
Line 47, "Z)" should read --(Z)--; and
Line 48, "diagramatic" should read --diagrammatic--.

UNITED STATES PATENT AND TRADEMARK OFFICE
CERTIFICATE OF CORRECTION

PATENT NO. : 5,241,527  
DATED : August 31, 1993  
INVENTOR(S) : EGUCHI, ET AL.

It is certified that error appears in the above-indentified patent and that said Letters Patent is hereby corrected as shown below:

COLUMN 6:

Line 55, "increase" should read --increased--; and  
Line 61, "a" should be deleted.

COLUMN 7:

Line 2, "criterions." should read --criteria.--;  
Line 6, "voltages" should read --voltages)--;  
Line 39, "manner" should read --EXAMPLE 2 ¶ using a recording medium comprising three layers of purple membranes provided on a substrate electrode made of gold, recording-reproducing tests were carried out under photo-irradiation in the same manner--;  
Line 47, "2 mQ" should read --2 mℓ--;  
Line 48, "MgSO$_4$" should read --MgSO$_4$--;  
Line 49, "1 mQ" should read --1 mℓ--;  
Line 60, "mg/mQ" should read --mg/mℓ--;  
Line 61, "mQ" should read --mℓ--; and  
Line 66, "2.2 mQ" should read --2.2 mℓ--.

COLUMN 8:

Line 24, "Qshima," should read --Oshima,--;  
Line 28, "10 mg/mQ," should read --10 mg/mℓ,--;  
Line 48, "hey" should read --they--;  
Line 49, "Iimitation" should read --limitation--; and  
Line 54, "Here" should read --There--.

UNITED STATES PATENT AND TRADEMARK OFFICE
CERTIFICATE OF CORRECTION

PATENT NO. : 5,241,527
DATED : August 31, 1993
INVENTOR(S) : EGUCHI, ET AL.

It is certified that error appears in the above-indentified patent and that said Letters Patent is hereby corrected as shown below:

COLUMN 9:

Line 6, "[2]" should read --(2)--;
Line 8, "[3]" should read --(3)--;
Line 9, "probe" should read --said probe--;
Line 10, "[4]" should read --(4)--;
Line 11, "probe" should read --said probe--; and
Line 44, "obtained and" should read --obtained; and--.

COLUMN 10:

Line 4, "sad" should read --said--;
Line 7, "sad" should read --said--; and
Line 27, "obtained and" should read --obtained; and--.

Signed and Sealed this

Twenty-seventh Day of September, 1994

Attest:

BRUCE LEHMAN

*Attesting Officer*     *Commissioner of Patents and Trademarks*